United States Patent [19]

Jaccard

[11] Patent Number: 5,525,102
[45] Date of Patent: Jun. 11, 1996

[54] MEAT-TENDERIZING MACHINE

[75] Inventor: Andre R. Jaccard, Holland, N.Y.

[73] Assignee: Jaccard Corporation, Orchard Park, N.Y.

[21] Appl. No.: 527,324

[22] Filed: Sep. 12, 1995

[51] Int. Cl.⁶ .................................................. A22C 9/00
[52] U.S. Cl. ............................................................ 452/141
[58] Field of Search .................................. 452/141, 144, 452/146, 147

[56] References Cited

U.S. PATENT DOCUMENTS

| 4,112,544 | 9/1978 | d'Arras | 452/141 |
| 4,338,701 | 7/1982 | d'Arras | 452/141 |
| 4,437,207 | 3/1984 | Ross | 452/141 |
| 5,312,290 | 5/1994 | Paulus | 452/141 |

FOREIGN PATENT DOCUMENTS

| 1018795 | 1/1953 | France | 452/141 |
| 1018797 | 1/1953 | France | 452/141 |
| 197268 | 2/1938 | Switzerland | 452/141 |
| 0345154 | 3/1931 | United Kingdom | 452/141 |
| 0503054 | 3/1939 | United Kingdom | 452/141 |
| 0503928 | 4/1939 | United Kingdom | 452/141 |

*Primary Examiner*—Willis Little
*Attorney, Agent, or Firm*—James J. Ralabate

[57] ABSTRACT

This invention provides a structure for meat tenderizers which substantially reduces the time and complexity of blade removal. A stripper frame is used which not only has an open side but also has mating sections which will mate with a separator holder in a simple and convenient construction.

18 Claims, 5 Drawing Sheets

MEAT-TENDERIZING MACHINE

This invention relates to a machine for tenderizing meat and, in particular, to the blade assembly of such machines.

BACKGROUND OF THE INVENTION

There are known various hand-operated and power-driven machines that are used by butchers and meat-packing houses to mechanically tenderize various types of meat, fish and poultry. Generally, these machines comprise a plurality of blade segments that are aligned at selected distances for penetration into the meat. These blades cut the tendons or connective tissues in the meat with very fine incisions and thereby tenderize the meat. The blade segments are movably connected to a handle means which, when pulled down, will lower the blades into the meat section positioned below the blades. The blades are connected to spring means which easily allow the downward and return upward movement of the blades after the tenderizing step.

Typical of these machines are those disclosed in U.S. Pat. Nos. 3,283,360; 3,583,025; 5,085,614 and 5,342,235.

In U.S. Pat. No. 3,283,360 (Tamain), a tenderizer is disclosed utilizing an assembly of close metal blades that are driven by an electric motor. The reciprocating movement of the blades driven by the motor forces them into the meat and withdraws them automatically. When the blade grid or assembly of blades is in position they are surrounded by a frame 35 which in turn is supported by two rods 36. All four sides of blades or cutting assembly 22 are surrounded by the frame 35. Thus, to remove Tamain's blade assembly for any reason, the blade assembly 22 must be lowered down from the encircling frame 35 after numerous bars, rods and separators are loosened or removed. This blade assembly removal process which is similar to the removal process of all of the above-noted patents, involves holding the sharp terminal ends of blades 22a. Not only is this blade assembly procedure cumbersome and complex but it also exposes the user's hands to injury from the sharp blade 22a ends.

In Jaccard U.S. Pat. No. 3,583,025, a similar blade assembly 42 made up of blades 44 is used. This assembly also is completely surrounded by a frame or stripper plate 46 which, as in Tamain, requires the blade assembly to be dropped from between the four sides of stripper plate 46. While the Jaccard tenderizer has been very successful, one serious drawback has been the blade removal procedure which is complicated and could be injurious. The series of vertically suspended blades 44 of Jaccard are maintained in close separation by the Jaccard separator of FIG. 4. The bars 72 of the Jaccard separator 5 keep the blades 44 in alignment during use. The Jaccard separator has a notch 88 provided in the edge of its carrier 76 which is used to connect separator 5 to his stripper plate 46 by use of a threaded bolt and thumbscrew 86; see FIG. 2 of Jaccard. Stripper plate 46 is shown in Jaccard's FIGS. 1 and 3 to completely surround his blade assembly 42.

In Bourret U.S. Pat. No. 5,085,614, the same or similar stripper plate 46 as used by Jaccard and Tamain is shown. In front view FIG. 1 and side view FIG. 2, Bourret shows that his stripper plate completely surrounds the array of blades or blade assembly 12. In FIG. 2 of Bourret, his separator is shown (unnumbered) having an extending handle just over his element 17. The unnumbered separator is attached on grid 17 at both the front and the back. To remove blade segment 12 of Bourret, his separator unit is unscrewed from the front and the back and his supporting branches 10 and 11 removed. The blade assembly is then allowed to fall down from grid 17 and be removed by supporting his sharp blade ends at the lower terminal portion of the blades.

In Watanabe, U.S. Pat. No. 5,342,235, an automatic meat tenderizer is shown but it is quite dissimilar to the Jaccard or Bourret devices. Watanabe, however, also completely encloses his blades or needles by connecting members 29.

In all of the above-discussed prior art, blade removal was a complicated and serious problem. All of the manufacturers attempted solutions to simplify blade assembly removal but, as of the present time, there remains difficulties involved with this removal process. The enclosure around all sides of the blades was believed required since the separators required front attachment to the stripper frame and, accordingly, a four-sided stripper has been retained in all commercial machines of this type.

SUMMARY OF THE INVENTION

It is therefore an object of this invention to provide a blade composite structure devoid of the above-noted disadvantages.

Another object of this invention is to provide a blade composite structure where the blade assembly can be easily and safely removed.

Still another object of this invention is to provide a novel stripper frame which mates with and is used with a novel separator and holder.

Another object of this invention is to provide a simple unique method for removing blade assemblies from the type of tenderizer herein described.

Still a further object of this invention is to provide a unique blade assembly unit including a separator-stripper frame combination which is simple to use and manufacture.

A yet further object of this invention is to provide a separator-stripper frame combination that can be easily retrofitted into existing machines.

These and other objects of this invention are accomplished, generally speaking, by an interconnected stripper frame and separator and complete blade assembly unit that is simple to use when installing or removing a blade assembly from a tenderizing machine. Rather than the stripper frame completely surrounding the blade assembly as in the prior art, the stripper frame of this invention has the front side portion completely open. This allows the blade assembly to be easily withdrawn through this open side. At the terminal end portions of this open side are means that mate with a counterpart on the terminal portions of a holder separator bar. Therefore, when the blade assembly is in place, the separator holder bar is matched with the counterpart end portions on the three-sided stripper frame, the separators fitted between the blades of the blade assembly and the separator holder bar attached to and fixed to the stripper frame. The stripper frame is of a square, horseshoe-like configuration with inwardly extending portions on the terminal ends of legs or sides adjacent the open side. On these extending portions are positioned the counterpart matching sections which will mate with the part on the separator bar holder. These mating or matching sections can be of any suitable configuration so long as the sections tightly and securely mate. Also, it is important that a threaded rod and tightening nut or any other means of retention be used to connect these mating sections together and fix the separator in place. The separator bar may contain one or more separator assemblies depending upon the desired results.

The components of the interconnected separator-stripper frame combination can be made of any suitable material that is acceptable for food contact use.

DESCRIPTION OF THE DRAWINGS AND PREFERRED EMBODIMENTS

Figure 1:
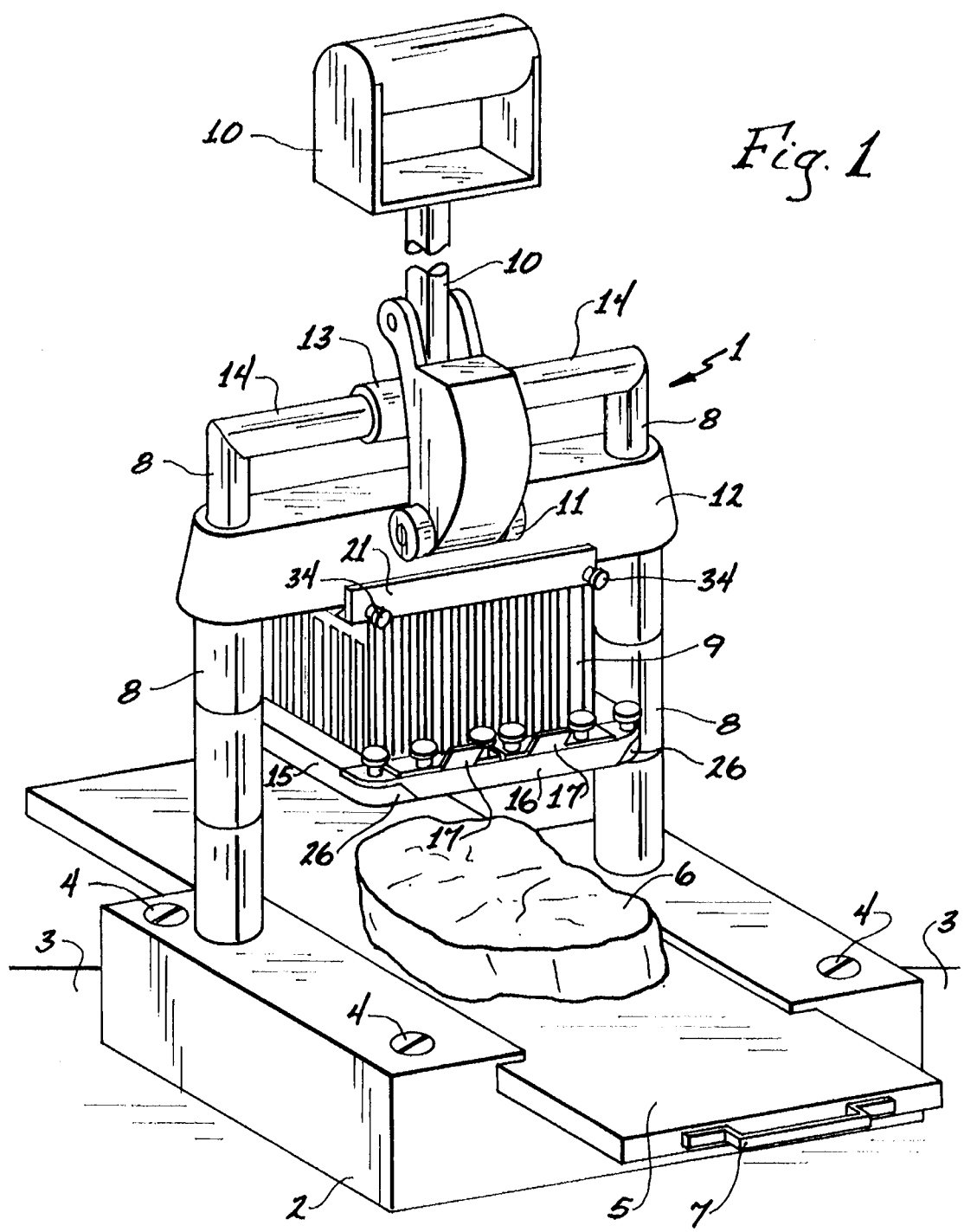
FIG. 1 is a perspective front view of the complete machine in which the separator-stripper frame of this invention is used.
Figure 2:
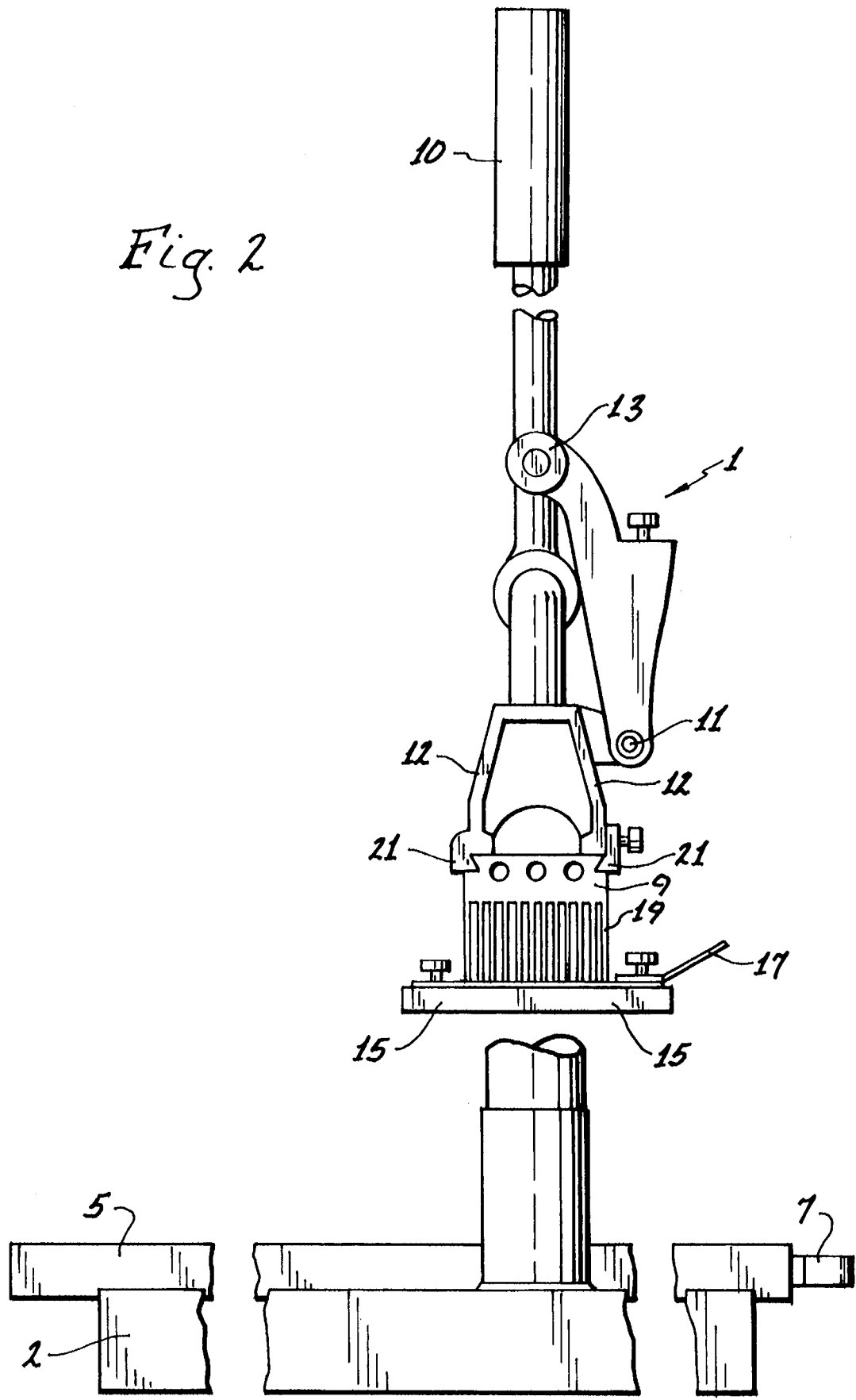
FIG. 2 is a plan side view of the complete machine in which the separator-stripper frame of this invention is used.
Figure 3:
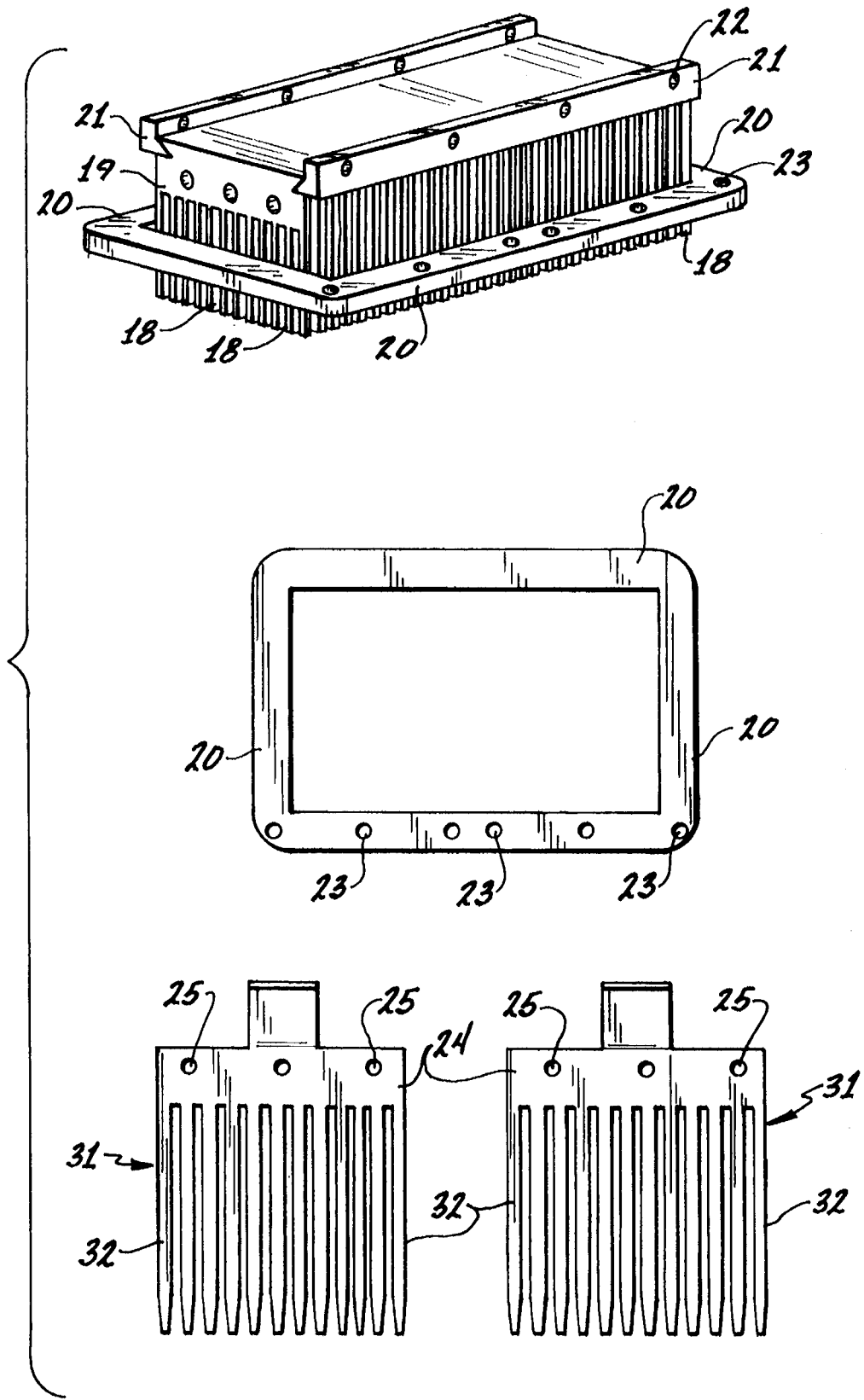
FIG. 3 is a perspective view of the prior art blade assembly units with the all-enclosing stripper frame. Also illustrated are top plan views of the prior art stripper framne and separator units.

In FIGS. 1 and 2, the machine 1 in which the unit of this invention may be used is illustrated. A typical machine would be the Jaccard® Model H Tenderizer; Jaccard is a registered trademark of Jaccard Corporation. Of course, any tenderizing machine may use the blade assembly unit (including separators and stripper frame) of this invention if suitable. The machine 1 includes a base 2 that is, for stability, generally bolted to a support surface 3 by bolts 4. Base 2 has in its center section a sliding board 5 which supports the meat 6 to be tenderized. Board 5 has a board grip 7 which is used to push or pull the board 5 holding the meat during and before or after tenderizing. Extending upwardly from the base 2 are spring-loaded columns 8 which allow blades or blade assembly 9 to move up or down upon movement of handle 10. Handle 10 is movably attached to hinges 11 to an upper boat structure 12 and by hinges 13 to coupling bar 14. As handle 10 is pushed or pulled down, the blade assembly is forced down into the meat 6 and each blade will sever the tendons or connective tissues in meat 6 and thereby tenderize same. The novel portion of the machine 1 defined by this invention involves the complete blade assembly 9 including the novel, three-sided stripper frame 15 and the novel counterpart separator bar 16 holding separators 17 (see FIG. 5 for specifics of bar 16 and separators 17). While machines such as the Jaccard® Model H have been very reliable, changing of the blades in blade assembly 9 in this and other similar machines has been very difficult. Because of the sharp edges 18 of blades 19, serious injury is possible because of hand support for the blade assembly 9 when the assembly 9 is lowered between prior art stripper frames 20 as seen in FIG. 3. Since the only removal movement possible in prior art devices is a downward movement through the four-sided stripper frame 20, the user must support blade assembly 9 with his or her hand. As earlier noted, because of sharp edges 18 of blades 19, care and time must be taken when removing and/or changing blades 19 or blade assembly 9. The sharp blade edges 18 could easily cut the user's fingers and, because of the blade's contact with the meat, the possibility of bacteria and other infectious organisms on the blades is very high. It would be much more desirable to avoid contact with these sharp edges 18. A dovetail or holding bar 21 holds blade assembly 9 in place during assembly and also must be loosened when removing or changing blade assemblies. The dovetail or holding bar 21 has apertures 22 that are used when bolting or connecting the blade assembly 9 to the boat 12. The prior art stripper frame 20 also has apertures 23 therein for attaching prior art separators 24 to the stripper frame 20. Apertures 25 in separators 24 align with apertures 23 in the stripper frame 15.

Figure 4:
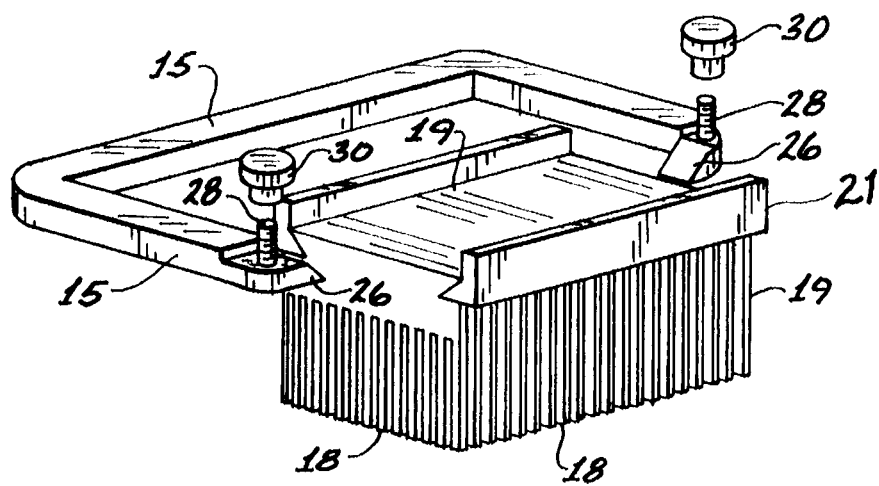
FIG. 4 is a perspective view of the squared horseshoe-like stripper frame of the present invention with one side opened.
Figure 5:
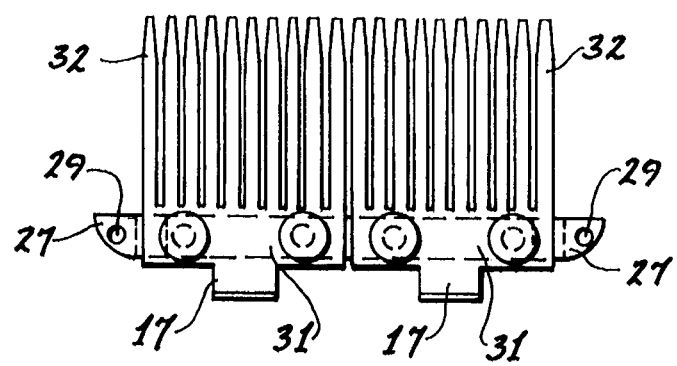
FIG. 5 is a top plan view of the separator bar and separators of the present invention.

In FIGS. 4 and 5 the novel stripper frame 15 and novel separator bar 16 of this invention are illustrated. These components, together with blade assembly 9, make up the novel blade assembly unit claimed in this invention. The stripper frame 15 of this invention is structured in the configuration of a squared horseshoe with two inwardly extending prongs 26. These prongs 26 mate with and are the counterpart of terminal end portions 27 of the separator bar 16. The prongs 26 have an upwardly extending threaded bolt or other type of retaining device 28 which will fit into and lock with bar terminal apertures 29 with corresponding nuts, wing nuts or other means of retention 30. Any number of separator segments 31 may be used as well as any number of separator fingers 32. The number of separator fingers 32 will be determined by the number of spaces between each blade 19. It is critical to this invention that prongs 26 fit tightly against and mate with bar end portions 27. Also critical is the opened side of stripper frame 15 through which the blade assembly 9 is easily moved in a substantially horizontal motion.

Figure 6:
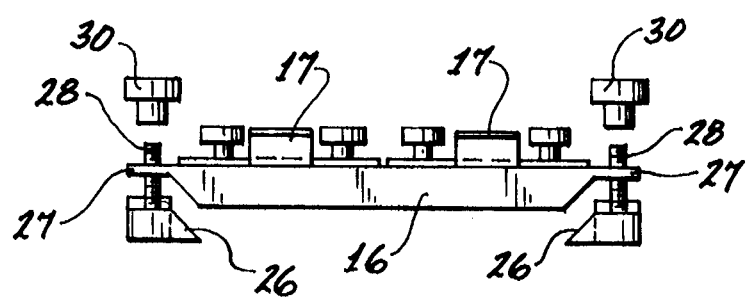
FIG. 6 is a front plan view of the mating separator bar and stripper frame of this invention just prior to fixing together.

In FIG. 6 a front plan view of the fitting of the stripper frame prongs 26 and bar terminal sections 27 is illustrated just prior to securing together by wing nuts or other means 30. The space between prongs 26 should be sufficient to permit the blade assembly 9 to pass therethrough. As earlier noted, any configuration of supplemental sections 26 and 27 may be used provided they mate tightly and permit easy separations or connections. The angular structures of 26 and 27 shown in the drawing are, however, highly preferred since they have tested out extremely well in terms of convenience, security and durability.

Figure 7:
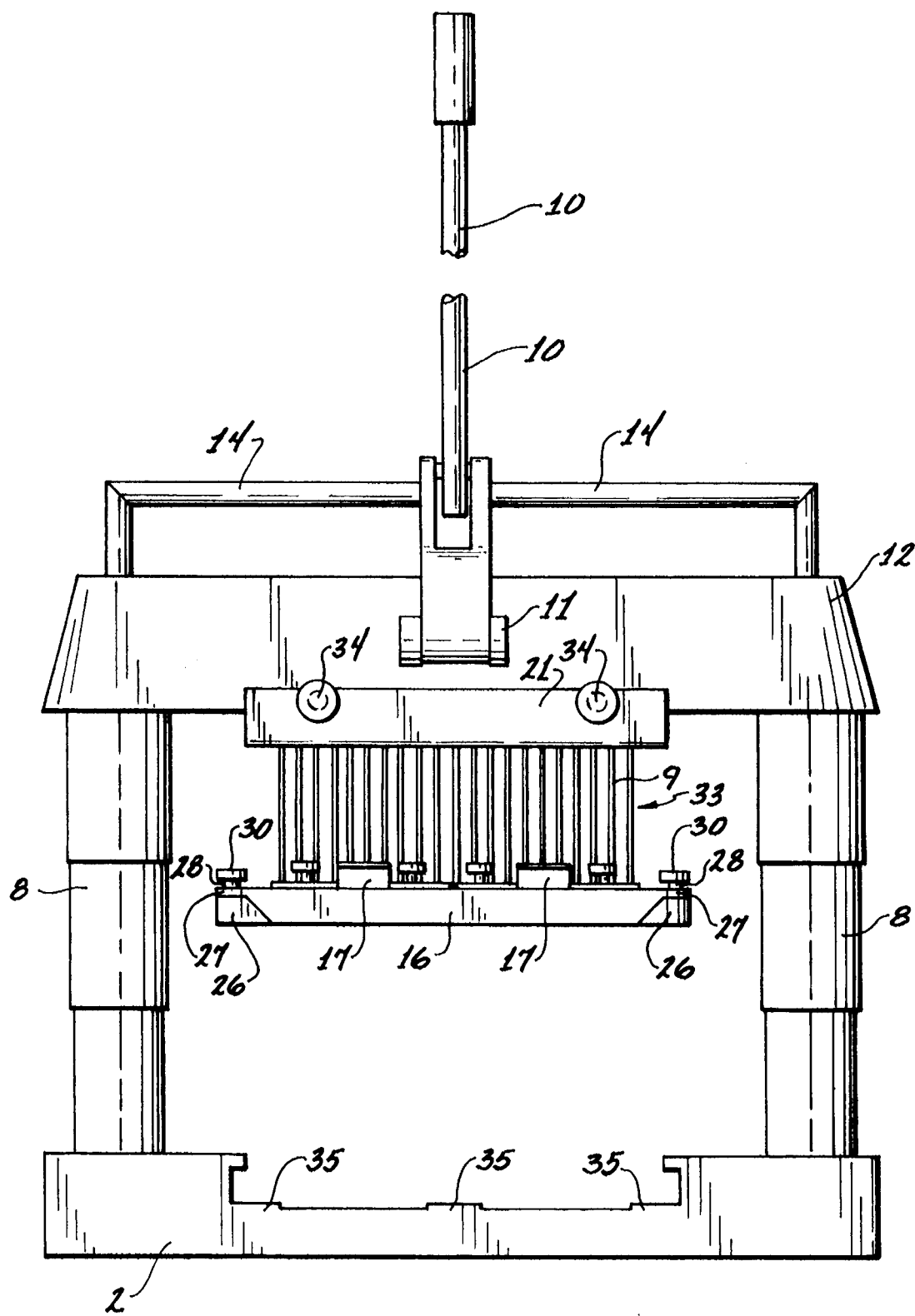
FIG. 7 is a front perspective view of the assembled blade assembly unit including the separator bar and stripper frame structures.

In FIG. 7, a close up perspective view of the novel blade assembly unit 33 of this invention is shown. Blade assembly unit 33 comprises a rectangular blade assembly 9, a squared horseshoe configured stripper frame 15, a separator bar 16 with separators 17 (separator element) and attaching means 28, 29, 30 and 34. Elements 34 are the dovetail bar attaching means that hold and fix the blade assembly 9 to the boat 12. While blade assemblies 9 are shown as rectangular, any other configuration may be used. The base 2 is illustrated without sliding board 5 so that board guide grooves or tracks 35 could be shown. Any type of base or board may be used in the present invention.

The preferred and optimumly preferred embodiments of the present invention have been described herein and shown in the accompanying drawings to illustrate the underlying principles of the invention but it is to be understood that numerous modifications and ramifications may be made without departing from the spirit and scope of this invention.

What is claimed is:

1. A blade assembly unit for use with a mechanical meat tenderizer which comprises a plurality of rectangular blade segments making up a blade assembly, a stripper frame and a separator element, said stripper frame enclosing three sides of said rectangular blade segments and on a fourth open stripper frame side having an opening sufficient to permit said blade assembly to pass therethrough, said separator element including a separator bar with two bar terminal ends and said bar having separator fingers attached thereto, said stripper frame having a substantially squared horseshoe configuration with prongs extending inwardly from legs adjacent said opening, said prongs and said bar terminal ends having counterpart means which mate with each other when in a fixed assembled mode.

2. The blade assembly of claim 1 wherein said bar terminal ends and said prongs are connected together by removably securing means.

3. The blade assembly of claim 1 wherein said prongs have upwardly extending threaded bolts which will fit through aligned apertures in said bar terminal ends.

4. The blade assembly of claim 1 wherein said separator element rests upon and is fixed to said stripper frame at said prongs.

5. The blade assembly of claim 1 wherein said stripper frame rests upon and is fixed to said separator element.

6. The blade assembly of claim 1 wherein said blade assembly is movable as a unit by manual or power means.

7. The blade assembly of claim 1 wherein said stripper plate prongs and said bar terminal ends are configured with angles which are supplemental to each other.

8. The blade assembly of claim 1 wherein said blade assembly has means for attachment to a boat section of a tenderizer.

9. The blade assembly of claim 1 wherein said rectangular blade assembly has at least one dimension which is less than the dimension of said stripper frame fourth side.

10. A meat tenderizer comprising a blade assembly unit, said blade assembly unit comprising a plurality of rectangular blade segments making up a blade assembly, a stripper frame and a separator element, said stripper frame enclosing three sides of said rectangular blade segments and on a fourth open stripper frame side having an opening sufficient to permit said blade assembly to pass therethrough, said separator element including a separator bar with two bar terminal ends and said bar having separator fingers attached thereto, said stripper frame having a substantially squared horseshoe configuration with prongs extending inwardly from legs adjacent said opening, said prongs and said bar terminal ends having counterpart means which mate with each other when in a fixed assembled mode.

11. The meat tenderizer of claim 10 wherein said bar terminal ends and said prongs are connected together by removable securing means.

12. The meat tenderizer of claim 10 wherein said prongs have upwardly extending threaded bolts which will fit through aligned apertures in said bar terminal ends.

13. The meat tenderizer of claim 10 wherein said separator element rests upon and is fixed to said stripper frame at said prongs.

14. The meat tenderizer of claim 10 wherein said stripper frame rests upon and is fixed to said separator element.

15. The meat tenderizer of claim 10 wherein said blade assembly is movable as a unit by manual or power means.

16. The meat tenderizer of claim 10 wherein said stripper plate prongs and said bar terminal ends are configured with angles which are supplemental to each other.

17. The meat tenderizer of claim 10 wherein said assembly has means for attachment to a boat section of a tenderizer.

18. The meat tenderizer of claim 10 wherein said rectangular blade assembly has at least one dimension which is less than the dimension of said stripper frame fourth side.

* * * * *